United States Patent Office 3,386,527
Patented June 4, 1968

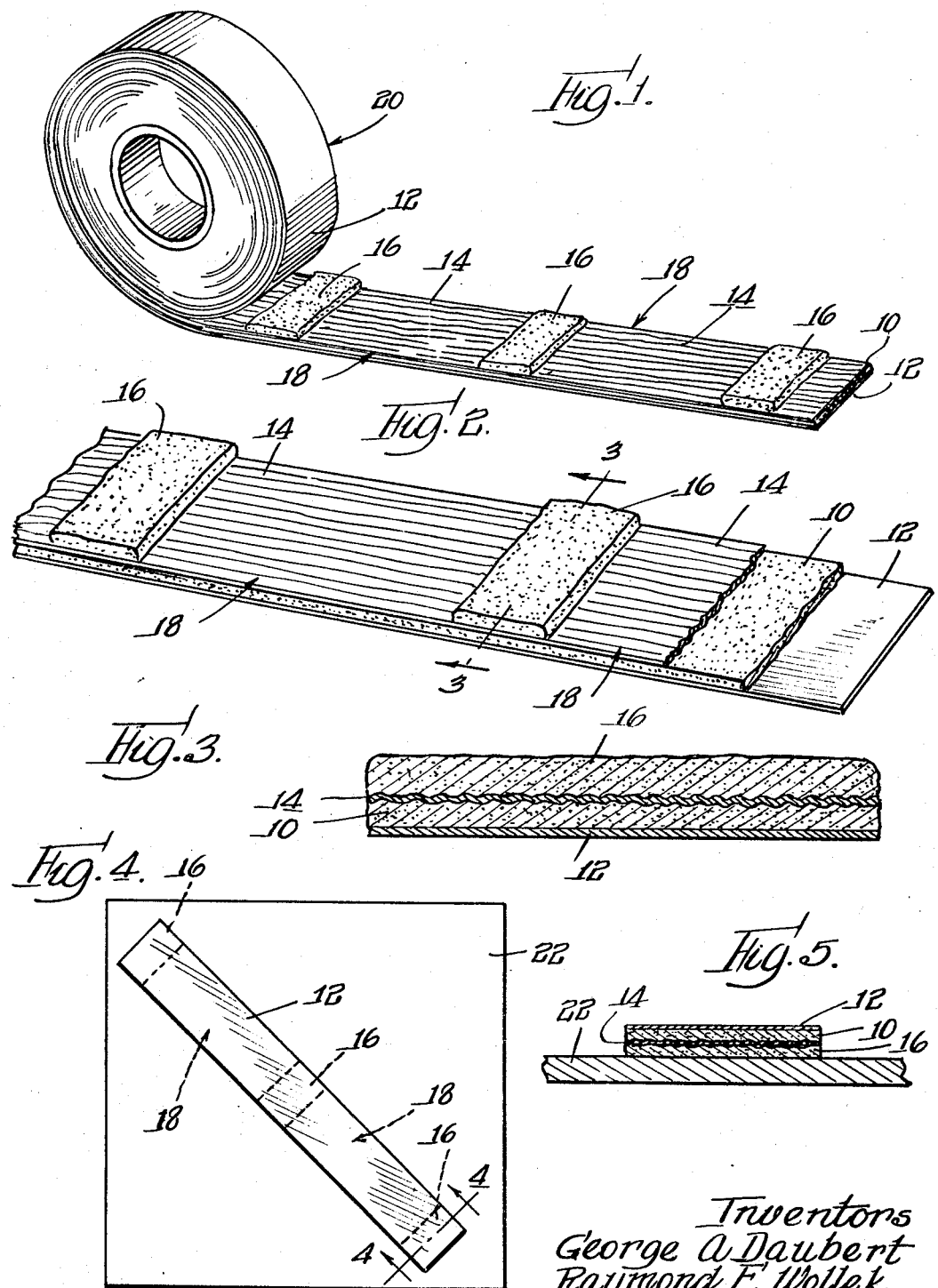

3,386,527
ADHESIVE SOUND DAMPING TAPE FOR
APPLICATION TO VIBRATING PANELS
George A. Daubert, Chicago, Raymond F. Wollek, Palos
Heights, and Zoltan Kutashy, La Grange Park, Ill., assignors to Daubert Chemical Company, Oak Brook,
Ill., a corporation of Illinois
Filed Aug. 5, 1965, Ser. No. 477,406
14 Claims. (Cl. 181—33)

The present invention relates to sound damping and particularly to improved sound damping materials in tape or relatively narrow sheet form (hereafter for convenience referred to generically as tape or tapes) and to a method of making such materials in tape form.

The damping, deadening or absorption of sound vibrations is a problem to which a great deal of attention has been given for a long period of time by those versed in the art. Typical of approaches thereto are shown by such illustrative U.S. Patents as Nos. 1,628,090; 1,928,034; 3,087,248; 2,355,568; 2,386,502; 2,534,137; and 2,819,032. Some of the difficulties with various heretofore known prior art practices and proposals, such as excessive weight, unwieldy thicknesses, high equipment costs, difficulty in application, and limited effectiveness are outlined in the aforementioned U.S. Patent No. 2,355,568. Possibly the most widespread current use of sound damping or sound deadening materials is in the form of spray-on coatings.

In more recent years, in an effort to reduce weight and for other reasons as well, vibration damping tapes have been suggested and utilized in the art, reference thereto being made, for example, in the aforesaid U.S. Patent No. 2,819,032. Typical of such vibration damping tapes is one comprising an aluminum foil backing of about 0.0017 inch thickness laminated with a pressure-sensitive adhesive to an unbleached cotton cloth, utilizing a rubber-base pressure-sensitive adhesive. Such vibration damping tape is attached to the thin sheet metal panels where sound is transmitted through the panels by the vibration of the panels themselves. The aluminum foil is separated from the sheet metal panel to which it is attached by an approximately 14 mil thickness of adhesive and cloth, and the mechanism of the sound damping is alleged to result from the existence of a so-called "truss" effect which adds to the stiffness of the metal panel and which combines with the natural absorbing qualities of the rubber forming the base of the adhesive.

Still more recently, sound damping tapes have been evolved which have substantially improved sound damping properties over those sound damping materials of the type disclosed in the aforementioned patents. Embodiments of these improved tapes are disclosed in U.S. Patent No. 3,193,049, dated July 6, 1965, and in copending U.S. patent application Ser. No. 122,716, filed July 10, 1961, now Patent No. 3,205,972. Briefly, the tapes described therein comprise elongated, pliable laminates which include a continuous strip of appreciable thickness of a sound dissipative adhesive material to one side of which is adhered a backing strip and to the other side of which is adhered a non-adhesive conversion material. The non-adhesive conversion material is arranged on the sound dissipative adhesive material in a manner to provide alternate exposed areas of the sound dissipative adhesive material for adhesively maintaining the laminate on a panel or the like.

While the sound damping effects obtained with the laminates described in said U.S. Patent No. 3,193,049 and said copending application are, generally, severalfold as great as those obtainable with heretofore known vibration damping tapes, certain limited problems have arisen in their use, specifically in regard to variability of damping obtained due to the amount of pressure placed on the laminates when they are applied to a surface. Thus, if the pressure applied is too great, the sound damping properties of the laminates are materially diminished. Another problem encountered in the use of the laminates is that they manifest a marked lessening in their sound dampening properties with the passage of time.

In accordance with the present invention a sound damping tape construction, in the form of a laminate, and a method of fabricating such a construction, have been evolved which substantially overcome the difficulties encountered with heretofore used sound damping tapes. The tape construction of this invention not only provides increased sound damping effects over those obtained with various prior art tapes, but also provides these superior effects for prolonged periods of time and substantially independently of the amount of pressure employed in applying it to a surface. More specifically in this connection, the sound damping effects attained with the tape construction of this invention range from 30 to 40% greater than those obtained with the prior art laminates, and these superior effects are provided for prolonged, though indeterminate time periods, whereas the effects provided by the prior laminates diminish considerably in a matter of a few weeks or months, dependng on the environment in which they are used. These results, as stated, are achieved with the tape construction of the present invention substantially irrespective of pressure considerations.

The objectives of the present invention are met by providing an unique sound damping tape which comprises an elongated, pliable laminate including a continuous or essentially continuous, elongated strip of appreciable thickness of a sound dissipative adhesive material to one side of which is adhered a flexible backing strip and to the other side of which is adhered a layer of a non-adhesive conversion material. The non-adhesive conversion material at least mainly covers the entire width of said other side of the strip of sound dissipative adhesive material and may be continuous or discontinuous. From the standpoint of ease and economy in manufacture, the non-adhesive conversion material is continuous and of substantially the same length as the strip of sound dissipative adhesive material. A plurality of relatively narrow "spacers" or areas of sound dissipative adhesive material are adhered to said other side of the strip of sound dissipative adhesive material and are arranged along the length of the tape in longitudinally spaced relation with respect to one another. The "spacers" or narrow areas of sound dissipative adhesive material largely lie in a plane above or outwardly from the plane of the exposed surface of the non-adhesive conversion material and are adhesively surfaced to enable the tape to be adhered to and maintained on a panel or the like. The term "sound dissipative adhesive material," as used herein, refers to materials capable of damping or deadening sound producing vibrations within the audible sound frequency range, and is intended to include a pliable, cementitious mass which may comprise a resin or resin-like substance, asphaltic bitumens, and/or elastomeric polymers, and compatible mixtures of two or more of the foregoing with or without the incorporation of inert minerals, fillers and/or pigments, and which may be inherently pressurably adhesive or rendered so. For convenience, such a cementitious mass hereafter is referred to generically as a mastic. The term "non-adhesive conversion material," as used herein, refers to a resilient barrier material which presents a free, non-adhering surface between a vibratable surface and the sound dissipative adhesive material on which it is carried, and which has the property of being capable of converting mechanical (vibratory) energy to frictional (heat) energy.

Referring, now, to the drawings, in which, among other things, an illustrative, but particularly preferred, embodiment of the tape of the present invention is shown:

FIG. 1 is a perspective view, in roll form, of said embodiment;

FIG. 2 is an enlarged fragmentary view in perspective showing the relationship of various elements comprising said embodiment;

FIG. 3 is a vertical sectional view taken substantially along line 3—3 of FIG. 2;

FIG. 4 is a plan view showing a simple form of applying a portion of said embodiment to a panel; and FIG. 5 is a vertical sectional view taken substantially along line 4—4 of FIG. 4.

As shown in FIGS. 1, 2 and 3, the illustrated embodiment of the sound damping tape of this invention comprises a continuous strip 10 of a sound dissipative adhesive material to one side of which is adhesively adhered a backing strip 12. A strip 14, of substantially the same length and width as the strip 10, of creped parchment paper is adhesively adhered to the other side of the strip 10. Adhesive areas such as strips or bands or spacers 16 are positioned on the strip 14, in spaced apart relation, longitudinally of the tape to leave spaced areas 18 of non-adhesive conversion material which may be formed from separate pieces of creped parchment paper or from a continuous strip thereof, as shown. The sound damping tape is rolled upon itself to form a roll 20. The exterior surface of the backing strip 12 is provided with a thin release coating (not shown).

In FIG. 4, a simple illustration is given of one form of application of the sound damping tape to a sheet of steel 22. As shown, a portion or segment of the roll 20 is applied diagonally of the sheet 22 with the spacers 16 placed at approximately the nodal points of the sheet 22. The spacers 16, as best seen in FIG. 5, tend to hold the areas 18 of non-adhesive conversion material away from and/or in light contact with the sheet 22.

The energy or sound dissipative adhesive material employed in the fabrication of the tapes of this invention is most desirably, particularly from the standpoint of economy, a mastic which is inherently tacky or adhesively pressure-sensitive, that is, it possesses the ability to adhere, and particularly desirably to adhere very firmly, to the metal sheet, panel or like surface simply by pressing it against the surface with hand or analogous pressure. Such mastics are well known in the art and are readily available for selection. Mastics that we have found to be very satisfactory, and this is mentioned solely by way of illustration and not limitation, have the following compositions, the parts listed being by weight:

*Example A*

Polybutene (Av. M.W. 1100 to 1200, Viscosity 125,000 to 140,000 SUS at 100 degrees F., "Oronite 32" or "Indopol H–300") _____ 18
Natural rubber hydrocarbon _____ 15.5
Rubbery copolymer of isoprene and isobutylene ___ 20
Calcium carbonate (325 mesh) _____ 30.5
Asbestos (7 T grade-short fibre) _____ 15.5
Vegetable fatty acid (Archer-Daniels-Midland Fatty Acid No. 105—Acid value from 195 to 205) ___ 0.5

*Example B*

Polybutene ("Indopol H–100"—Amoco Chemical Company) _____ 21.5
Rubbery copolymer of isoprene and isobutylene ___ 26
Calcium carbonate (325 mesh) _____ 35
Asbestos (7 T grade-shortfibre) _____ 14.5
Aromatic petroleum plasticizer ("A.P. 25"—Pennsylvania Refining Company) _____ 2
Amine wetting agent ("Redicote T"—Armour & Company) _____ 1

Such mastics, when used in accordance with the practice of this invention, retain their pressure-sensitive adhesive properties over substantial periods of time and delamination does not occur over wide ranges of temperature as, for example, from −20° F. to 250° F., or higher.

As indicated in the foregoing definition of the term "sound dissipative adhesive material," various other substances can be utilized as base materials in forming the mastic. In general, such substances desirably are elastomeric or rubber or rubber-like materials of natural or synthetic character, illustrative examples of which comprise polyisobutylenes, polyvinyl chloride, polyvinyl ethers, natural gum, Buna rubbers, neoprene, butyl rubbers, SBR, reclaimed rubber, polyacrylate esters, and the like. In utilizing a rubber or rubber-like substance as a base material for the mastic, it has been found that, for best results, the hardness of the substance is a significant consideration. Generally speaking, the Shore "A" hardness of such a substance should not be greater than about 95. Especially good results are attained with rubber or rubber-like substances having a Shore "A" hardness in the range of about 60 to 90, particularly about 70 to 85.

While pressure-sensitive adhesives are especially desirable, as pointed out above, it is also within the broader phases of the present invention to utilize heat- or solvent-activated adhesives which possess strong adherence properties and which have little or no slow creep or flow characteristics with age. Such adhesives are, per se, well known in the art, and may comprise elastomer-resin compositions or, where high temperature use is involved, may comprise silicate or other inorganic based adhesives. The properties of the mastic employed as the sound dissipative material, whether it be of the pressure-sensitive or solvent-activated type, may be modified by the incorporation therein, for example, of plasticizers such as liquid polybutenes and polyacrylates, and fillers exemplified by zinc oxide, titanium dioxide, asbestos, aluminum hydrate, calcium carbonate, clay, pigments, and the like.

The thickness of the mastic used in the sound damping tapes of this invention is subject to substantial variations. Generally speaking, mastic thicknesses should be in the range of from ¹⁄₁₆ inch to ⁵⁄₁₆ inch, especially desirably ⅛ inch to ⅜ inch, particularly where an adhesive mastic having a specific gravity of from about 1.5 to about 1.6 is utilized. Depending upon the specific gravity of the mastic, the thickness of the tapes may vary appreciably from these values, although, if the thickness is relatively substantial, the tapes cannot satisfactorily be marketed or distributed in the form of rolls.

The widths of the sound damping tapes of the present invention are variable. Generally speaking, it is desirable to utilize tapes ranging in width from about 1 to about 6 inches, particularly satisfactory being tapes having widths in the range of about 1 to about 2 inches. Some variation in sound damping occurs with changes in width, other factors being equal.

In achieving generally optimum results pursuant to the present invention, the mass of the mastic in relation to the dimensions of the laminate or tape should fall within a selected range. Thus, by way of illustration, with a tape having a width of about 1 to 2 inches and a mastic thickness of approximately ⅛ to ⅜ inch, the mass of the mastic in relation to the length of the tape should fall within the range of from about 50 to 100 grams of mastic per lineal foot of tape, especially from about 65 to 95, and better still about 70 to 80, grams of mastic per lineal foot of tape.

The conversion materials, representing the non-adhesive areas, which aid in converting vibrational energy to thermal energy, are most advantageously striated or creped materials. Especially satisfactory are creped parchment papers. The stiffness, thickness and permanence of crease retention in said creped parchment papers influence to some extent the exact sound damping effects obtained but there is nothing critical in the exactitude of these characteristics. Conventional, commercially marketed creped parchment papers have been utilized in the practice of the present invention with excellent results. Other striated or creped materials such as creped glassine papers, high wet-strength creped papers such as resin-impregnated creped papers where the environment in which the damping tapes or sheets are such that the paper may become wet, calendered crepe papers, creped fabrics, or other creped cellulosic and non-cellulosic materials can be utilized. Where high temperatures may be encountered, creped fiber glass can be utilized. In the broader aspects of our invention, the conversion materials may be relatively smooth surfaced and may comprise paper, paper-coated burlap, resin-impregnated papers, parchment papers, glassine papers, fiber glass, polyurethane foams and polystyrene foams of the order of ⅛" thickness, and the like. However, as previously stated, creped or similar uneven surfaced conversion materials produce outstandingly satisfactory results and, therefore, are distinctly preferred. Creped papers having from 15 to 65 crepe lines per lineal inch are illustrative of those which can very effectively be used in the production of the sound damping tapes of our invention. As indicated hereinabove, the non-adhesive conversion material may be adhered to the sound dissipative adhesive material in a continuous or discontinuous form without critical effect on the sound damping properties of the tape. Ease and economy in manufacture, however, dictate the use of the non-adhesive conversion material in a continuous, single strip form.

The dimensions and spacings of the strips or bands or spacers of mastic on the laminate or tapes of this invention also are variable. The spacers, generally speaking, should be of sufficient length and width to insure good adhesion of the sound damping tape to a metal sheet or panel, or the like, to which it is attached, and should have a thickness such that the exposed surface of the spacer lies in a plane sufficiently above or outwardly from the plane of the exposed surface of the on-adhesive conversion material to enable at least portions of said exposed surface of the non-adhesive conversion material to move with relation to the surface of a panel, or the like, to which the tape is adhered, in a plane, or planes, substantially transverse to the plane of said surface of the panel, or the like, substantially irrespective of the amount of pressure used in applying the tape to said surface. Thus, again by way of illustration, a sound damping tape made in accordance with the practice of this invention having a width of about 1 to 2 inches will provide excellent sound damping effects with spacers having a width of about ½ inch to about 1½ inches, especially desirable from about ¾ inch to about 1 inch, and a length corresponding generally to that of the width of the tape, and having a thickness ranging from about 1/16 inch to about ¼ inch, preferably about ⅛ inch to 3/16 inch. The spacings of the spacers on the laminate or tape should provide a spacer surface exposure to non-adhesive conversion material surface exposure ratio of 1 of the spacer surface exposure to about 2 to 5, usually 3 to 4, of the non-adhesive conversion material surface exposure. Thus, in the foregoing illustration, the spacers should be spaced longitudinally on the tape to provide intermediate areas of non-adhesive conversion material ranging in length from about 2 to 5 inches, especially desirably from 3 to 4 inches. The spacers advantageously should be formed from a soft, adhesive-like mastic, and conveniently may be formed of the same mastic as is utilized for the sound dissipative adhesive material.

In the particularly preferred embodiment of the present invention described, a backing strip is adhesively adhered to the side of the sound dissipative adhesive material opposite to that on which the non-adhesive conversion material and the spacers are carried. Various materials can be utilized for this purpose exemplary thereof being non-woven fibrous sheeting, non-fibrous film, aluminum metal or alloy foil as well as other metal foils, or the like. Very satisfactory results can be attained with flexible films which may be in the form of plastic laminate films. One such film is made from polyethylene terephthalate and is available commercially under the trademark "Mylar." The thickness of the backing strip may vary considerably but it is preferred to use a strip having a thickness of the order of 0.5 to 5, usually 1 to 2 mils. In accordance with the broader aspects of the present invention, no backing strip at all is required. The backing strip, while facilitating the handling and shipping of the tapes of this invention, is not essential to the sound damping effects attained by the tapes.

Where the sound damping tapes of this invention are marketed in the form of rolls, it is especially desirable, and in certain cases necessary, but depending upon the adhesive nature of the exposed surface of the energy or sound dissipative adhesive material, to provide a release coating on the backing strip where such a strip is utilized. It may, likewise, be desirable to employ a release coating where the tapes are marketed in flat form as by vertically stacking a plurality of tapes face to back in a box or carton or like container in order to prevent undue sticking together of the individual flat tapes. It will be understood, however, that the utilization of a release coating in the environment involved is not critical to the structural features of the sound damping tapes of this invention which account for the exceptional results which are achieved with reference to sound or vibration damping. Where a release coating is desired, it may be selected from various of those on the commercial market, many of which comprise silicone based compositions.

The sound damping tapes of the present invention have a wide scope of uses. Thus, by way of example, they can be used in such environments as automobile doors, panels, firewalls, hoods and trunk lids; aircraft fuselages and empennage panels; refrigerators, television cabinets, steel desks, filing cabinets, appliance cabinets, commercial and kitchen cabinets, business machine cabinets, heating and ventilating ducts, metal roofing, siding panels, stainless steel sinks, air conditioners, washing machines, trucks, railroad cars, and the like.

In the utilization of the sound damping tapes of the present invention, they can be applied in the same manner that sound damping tapes of the prior art have been used. They can, for example, be applied to selected areas of either one or both sides of metal sheets or panels, or several tapes may be superimposed on the tape which is attached to the metal sheet or panel. Generally speaking, in various instances, best results appear to be obtained where the adhesive portions are firmly applied at or approximately at nodal points of the metal sheets or panels or like. The tape, if not pre-cut to desired size, can be cut from a roll thereof, to the desired length or footage, and pressed directly against the metal surface at the desired area or areas thereof. It will, thus, be seen that it is unnecessary to cover entire metal surface areas as is the case with spray-on sound damping compositions.

The exact mechanism of the sound damping or deadening action of the tapes of the present invention has not fully been ascertained. It appears, however, from various tests and studies which have been carried out that it is not due to such effects as lateral surface friction between the tape and the metal sheet or panel, internal friction due to flexure of mastic or other sound dissipative adhesive materials, or interference or wave pattern interference due to mass location of the damping tape on the metal sheets or panels. It is possible, though by no means certain, that the sound damping tapes of this invention exert their sound damping effects by reason of collision or intermittent contact of the non-adhesive, particularly striated or creped, paper or the like with the vibrating portions of the metal sheets or panels, or through friction due to flexure of said non-adhesive conversion material portions of said tapes, or by reason of a resilient deformation of said conversion material. There are indications that the creped paper portions of the damping tapes slap against or strike the vibrating metal sheets or panels thereby bringing about a rapid decrease in the amplitude of vibration; and also that the creped paper or the like possesses a spring-like or springy action which allows the damping tape to vibrate out of phase with the metal sheet or panel, again thereby bringing about a rapid decrease in the amplitude of vibration of the metal sheet or panel. Most likely, the reasons for the unique functioning of the sound damping tapes of the present invention are due to a combination of two or more of the foregoing mechanisms.

What is claimed is:

1. A sound damping tape for application to panels or the like, said tape comprising an elongated, pliable laminate including an essentially continuous, elongated strip of appreciable thickness of a sound dissipative material, a non-adhesive conversion material having one of its surfaces adhesively adhered to one side of said strip and covering at least mainly the entire width thereof, and a plurality of relatively narrow, panel-surface engaging bodies on said one side of said tape arranged along the length of said tape in longitudinally spaced relation with respect to one another, said bodies of said adhesive material largely lying in a plane outwardly from the plane of the exposed surface of said non-adhesive conversion material and being adhesively surfaced to enable said tape to be adhered to a panel or the like.

2. A sound damping tape for application to panels or the like, said tape comprising an elongated, pliable laminate including an essentially continuous, elongated strip of appreciable thickness of a sound dissipative material, a backing strip adhesively adhered to one side of said strip of sound dissipative material, a continuous strip of a non-adhesive conversion material having one of its surfaces adhesively adhered to the other side of said strip of sound dissipative material and covering at least mainly the entire length and width thereof, and a plurality of relatively narrow, panel-surface engaging bands adhesively adhered to the exposed side of said non-adhesive conversion material and arranged along the length of said tape in longitudinally spaced relation with respect to one another, said bands largely lying in a plane outwardly from the plane of the exposed surface of said non-adhesive conversion material and being adhesively surfaced to enable said tape to be adhered to a panel or the like.

3. A sound damping tape for application to panels or the like, said tape comprising an elongated, pliable laminate including an essentially continuous, elongated strip of appreciable thickness of a sound dissipative material, a non-adhesive conversion material having one of its surfaces adhesively adhered to one side of said strip and covering at least mainly the entire width thereof, and a plurality of strips of adhesive material on said one side of said tape arranged along the length of said tape in longitudinally spaced relation with respect to one another, said strips of said adhesive material being adhesively surfaced to enable said tape to be adhered to a panel or the like and having a thickness such that the exposed surface thereof lies in a plane sufficiently outwardly from the plane of the exposed surface of the non-adhesive conversion material to enable at least portions of said exposed surface of the non-adhesive conversion material to move with relation to the surface of a panel or the like, to which the tape is adhered, in a plane or planes substantially transverse to that of said surface of the panel, or the like, substantially irrespective of the amount of pressure used in applying the tape to said surface.

4. A sound damping tape for application to panels or the like, said tape having a width of about 1 to 2 inches and comprising an elongated, pliable laminate including an essentially continuous elongated strip of a sound dissipative material, said sound dissipative material having a mass sufficient to provide from about 50 to 100 grams of the sound dissipative material per lineal foot of the tape, a backing strip adhesively adhered to one side of said strip of sound dissipative material, a non-adhesive conversion material having one of its surfaces adhesively adhered to the other side of said strip and covering at least mainly the entire width thereof, and a plurality of bands of adhesive material on said other side of said tape arranged along the length of said tape in longitudinally spaced relation with respect to one another, said bands of said adhesive material largely lying in a plane outwardly from the plane of the exposed surface of said non-adhesive conversion material and being adhesively surfaced to enable said tape to be adhered to a panel or the like.

5. A sound damping tape for application to panels or the like, said tape having a width of about 1 to 2 inches and comprising an elongated, pliable laminate including an essentially continuous, elongated strip of a sound dissipative material, said sound dissipative material having a thickness of from about $1/16$ inch to $5/16$ inch, a backing strip adhesively adhered to one side of said strip of sound dissipative material, a continuous strip of a creped non-adhesive conversion material having one of its surfaces adhesively adhered to the other side of said strip of sound dissipative material and covering at least mainly the entire length and width thereof, and a plurality of strips of sound dissipative material adhesively adhered to the exposed side of said non-adhesive conversion material and arranged along the length of said tape in longitudinally spaced relation with respect to one another, said strips of sound dissipative material having a width of from about $1/2$ to $1\frac{1}{2}$ inches and a length and thickness substantially corresponding to the width and thickness of said strip of said sound dissipative material, said strips of sound dissipative material largely lying in a plane outwardly from the plane of the exposed surface of said non-adhesive conversion material and being adhesively surfaced to enable said tape to be adhered to a panel or the like.

6. A sound damping tape for application to panels or the like, said tape having a width of about 1 to 2 inches and comprising an elongated, pliable laminate including an essentially continuous, elongated strip of a sound dissipative material, said sound dissipative material having a thickness of from about $1/8$ to $3/8$ inch and a mass sufficient to provide from about 70 to 80 grams thereof per lineal foot of the tape, a backing strip adhesively adhered to one side of said strip of sound dissipative material, a continuous strip of a creped non-adhesive conversion material having one of its surfaces adhesively adhered to the other side of said strip of sound dissipative material and covering at least mainly the entire length and width thereof, and a plurality of bands of sound dissipative material adhesively adhered to the exposed side of said non-adhesive conversion material and arranged along the length of said tape, said bands of sound dissipative material being spaced from one another at intervals of from about 3 to 4 inches and having a width of from about $3/4$ to 1 inch and a length and thickness substantially corresponding to the width and thickness of said strip of said sound dissipative material, said strips of sound dissipative material largely lying in a plane outwardly from the plane of the exposed surface of said non-adhesive conversion material and being adhesively surfaced to enable said tape to be adhered to a panel or the like.

7. A vibration damped construction comprising a sheet or panel subject to vibration in use and carrying on only limited areas of its surface at least one tape, said tape comprising an elongated, pliable laminate including an essentially continuous strip of a sound dissipative material to one side of which is adhered to a non-adhesive conversion material which covers at least mainly the entire width of said one side of the sound dissipative material, said one side of said sound dissipative material having a plurality of relatively narrow areas of adhesive material arranged along the length of said tape in longitudinally spaced relation with respect to one another, said areas of said adhesive material largely lying in a plane outwardly from the plane of the non-adhesive conversion material and being adhesively surfaced to enable said tape to be adhered and maintained on a sheet or panel.

8. A vibration damped construction comprising a sheet or panel subject to vibration in use and carrying on only limited areas of its surface at least one tape, said tape comprising an elongated, pliable laminate including a continuous strip of a sound dissipative material to one side of which is adhered a continuous layer of a non-adhesive conversion material which covers at least mainly the entire width of said one side of said sound dissipative material, the exposed surface of said non-adhesive conversion material facing said sheet or panel and having a plurality of bands of an adhesive material adhered to the exposed, panel-facing surface thereof, said bands being arranged along the length of said tape in longitudinally spaced relation with respect to one another and largely lying in a plane outwardly from the plane of the exposed, panel-facing surface of said non-adhesive conversion material to enable at least portions of said surface of said non-adhesive conversion material to move with relation to the opposed surface of said sheet or panel to which the tape is adhered in a plane or planes substantially transverse to the said opposed surface of said sheet or panel substantially irrespective of the amount of pressure used in applying the tape to said surface of the sheet or panel.

9. A vibration damped construction comprising a sheet or panel subject to vibration in use and carrying on only limited areas of its surface at least one tape having a width of 1 to 2 inches, said tape comprising an elongated, pliable laminate including a strip of a sound dissipative material, said sound dissipative material having a mass sufficient to provide from about 50 to 100 grams thereof per lineal foot of the tape and carrying on one side thereof a strip of a creped non-adhesive conversion material, said non-adhesive conversion material covering at least mainly the entire width of said one side of the sound dissipative material and having a plurality of bands of an adhesive material adhered to the exposed, panel-facing surface thereof, said bands being arranged along the length of said tape in longitudinally spaced relation with respect to one another and largely lying in a plane outwardly from the plane of the exposed, panel-facing surface of said non-adhesive conversion material to enable at least portions of said surface of said non-adhesive conversion material to move with relation to the opposed surface of said sheet or panel to which the tape is adhered in a plane or planes substantially transverse to the said opposed surface of said sheet or panel substantially irrespective of the amount of pressure used in applying the tape to said surface of the sheet or panel.

10. A vibration damped construction comprising metal in sheet or panel form subject to vibration in use and carrying on only limited areas of its surface at least one tape, said tape having a width of about 1 to 2 inches and comprising an elongated, pliable laminate including a strip of a sound dissipative material, said sound dissipative material having a thickness of from about 1/8 to 3/8 inch and a mass sufficient to provide from about 70 to 80 grams thereof per lineal foot of the tape and carrying on one side thereof a continuous strip of a creped non-adhesive conversion material, said non-adhesive conversion material covering at least mainly the entire width of said one side of the sound dissipative material and having a plurality of bands of an adhesive material adhered to the exposed, panel-facing surface thereof, said bands being spaced from one another longitudinally of the tape at intervals of from about 2 to 5 inches and having a width of from 3/4 to 1 inch and a length and thickness substantially corresponding to the width and thickness of said strip of said sound dissipative material, said bands mainly lying in a plane outwardly from the plane of the exposed, panel-facing surface of said non-adhesive conversion material to enable at least portions of said surface of said non-adhesive conversion material to move with relation to the opposed surface of said sheet or panel to which the tape is adhered in a plane or planes substantially transverse to the said opposed surface of said sheet or panel substantially irrespective of the amount of pressure used in applying the tape to said surface of the sheet or panel.

11. A method of preparing a sound damping tape for application to panels, or the like, comprising providing an elongated, pliable strip of appreciable thickness of a sound dissipative material, adhering to one side of said strip a non-adhesive conversion material, and applying to said one side of said strip a plurality of relatively narrow, panel-surface engaging bodies, said bodies being arranged along the length of said tape in longitudinally spaced relation with respect to one another and having a thickness such that they mainly lie in a plane outwardly from the plane of said non-adhesive conversion material.

12. A method of preparing a sound damping tape for application to panels, or the like, comprising providing an elongated, pliable strip of appreciable thickness of a sound dissipative material, adhering a flexible backing strip to one side of said strip of sound dissipative material, adhering a continuous layer of a non-adhesive conversion material to the other side of said strip of sound dissipative material, applying a plurality of bands of a panel-surface engaging adhesive material to said other side of said strip of sound dissipative material, said bands being arranged along the length of said tape in longitudinally spaced relation with respect to one another and having a thickness such that they mainly lie in a plane outwardly from the plane of said layer of non-adhesive conversion material.

13. A method of preparing a sound damping tape for application to panels, or the like, comprising providing an elongated, pliable strip of a sound dissipative material having a width of from about 1 to 2 inches and a thickness of from 1/16 to 5/16 inch and a mass sufficient to provide from about 50 to 100 grams thereof per lineal foot of tape, adhering a flexible backing strip to one side of said strip of sound dissipative material, adhering a layer of a non-adhesive conversion material to the other side of said strip of sound dissipative material, applying a plurality of strips of a panel-surface engaging adhesive material to said other side of said sound dissipative material, said strips of adhesive material being arranged along the length of said tape in longitudinally spaced relation with respect to one another and having a width of from about 1/2 to 1 1/2 inches and a length and thickness substantially corresponding to the width and thickness of said strip of said sound dissipative material.

14. A method of making a sound damping tape for application to panels or the like comprising providing an elongated, pliable strip of a mastic, said mastic having a Shore "A" hardness not greater than about 95, said strip having a width of about 1 to 2 inches and a thickness of about 1/8 to 3/8 inch, adhering a flexible plastic backing strip to one side of said strip of mastic, adhering a continuous strip of a creped parchment paper to the other side of said strip of mastic, and applying on said paper, at intervals of about 3 inches, bands of said mastic along the length of the tape, said bands of mastic having a width of from about ¾ to 1 inch and a length and thickness corresponding to the width and thickness of said strip of mastic.

References Cited

UNITED STATES PATENTS

| | | | |
|---|---|---|---|
| 2,006,232 | 6/1935 | Upson | 181—33 |
| 2,075,835 | 4/1937 | Spafford | 181—33 |
| 2,270,902 | 1/1942 | Rubissow | 181—33 |
| 3,087,571 | 4/1963 | Kerwin | 181—33 |
| 3,087,573 | 4/1963 | Ross | 181—33 |
| 3,087,574 | 4/1963 | Watters | 181—33 |
| 3,110,369 | 11/1963 | Ruzicka | 181—33 |
| 3,176,789 | 4/1965 | Lighter | 181—33 |
| 3,193,049 | 7/1965 | Wollek | 181—33 |
| 3,205,972 | 9/1965 | Stricker et al. | 181—33 |
| 3,217,832 | 11/1965 | Whitney | 181—33 |

ROBERT S. WARD, Jr., *Primary Examiner.*